United States Patent [19]
Omi et al.

[11] Patent Number: 5,510,683
[45] Date of Patent: Apr. 23, 1996

[54] MOTOR SPEED CONTROL DEVICE

[75] Inventors: Junichi Omi, Kawasaki; Hidenori Miyamoto, Urayasu; Tatsuo Amanuma, Ageo; Toshiyuki Nakamura, Tokyo, all of Japan

[73] Assignee: Nikon Corporation, Tokyo, Japan

[21] Appl. No.: 345,421

[22] Filed: Nov. 21, 1994

[30] Foreign Application Priority Data

Nov. 29, 1993 [JP] Japan ................... 5-323186

[51] Int. Cl.$^6$ .................. H02P 5/40; G03B 17/00
[52] U.S. Cl. .................. 318/271; 318/270; 388/809; 388/813
[58] Field of Search .................. 318/138, 245, 318/254, 270, 271; 388/800–890; 364/571.04; 354/439, 451, 452, 453

[56] References Cited

U.S. PATENT DOCUMENTS 5,023,648  6/1991  Meguro et al.

FOREIGN PATENT DOCUMENTS 1-260411  10/1989  Japan.
1-160425  11/1989  Japan.
4-162026  6/1992  Japan.

Primary Examiner—Paul Ip
Attorney, Agent, or Firm—Oliff & Berridge

[57] ABSTRACT

A motor speed control device, preferably for use in a camera, controls a motor to rotate at a constant speed in accordance with a pulsed signal output from a motor speed detector, such as a photointerrupter. To overcome the control problems that occur when the motor abnormally stops rotating, preventing generation of pulsed, the motor speed control device includes a timer that measures elapsed time from a most recent pulse. When the elapsed time exceeds a predetermined value, the motor speed control device accelerates the motor so that control of the motor at a constant speed can continue.

20 Claims, 3 Drawing Sheets

5,510,683

MOTOR SPEED CONTROL DEVICE

BACKGROUND OF THE INVENTION

1. Field of the Invention

The present invention relates to motor control devices, and more particularly, to motor speed control devices for use in cameras.

2. Description of Related Art

Japanese Patent Publication No. 4-162026 describes a conventional motor speed control device. With a motor speed control device of this type, the motor continues to rotate, due to its inertia, even when the motor is directed to slow or stop rotating. Although rotational speed falls while the motor continues to rotate, pulses used for controlling motor speed still are generated. Accordingly, even when the motor is directed to stop during speed control, it is possible to continue controlling it so as to maintain a constant speed.

However, when the motor has insufficient inertia and stops completely when directed to slow or to stop, the motor stops and the pulses used in speed control no longer are generated. In this instance, it becomes impossible to continue providing constant speed control.

SUMMARY OF THE INVENTION

To overcome the above and other problems, it is an object of embodiments of the invention to enable constant speed control to continue even when a motor has insufficient inertia to continue rotating.

A motor speed control device according to embodiments of the invention includes a motor speed detector coupled with a motor to detect motor speed and generate a pulsed signal having pulse intervals that vary in accordance with the detected motor speed. A controller receives the pulsed signal from the motor speed detector. The controller includes a comparator for comparing pulse intervals of the pulsed signal to a target value corresponding to a target motor speed, and for comparing time elapsed since a most recent pulse to a maximum value corresponding to an abnormally low motor speed. A command generator generates a drive command to drive the motor at the target speed in accordance with the pulse intervals comparison and an accelerate command to accelerate the motor in accordance with the elapsed time comparison when the elapsed time is greater than or equal to the maximum value. The device preferably includes a detector for detecting whether pulses of the pulsed signal are being generated. The comparator performs the pulse intervals comparison when the detector detects a pulse of the pulsed signal, and the comparator performs the elapsed time comparison when the detector does not detect a pulse of the pulsed signal.

According to another aspect of an embodiment of the invention, a method of operating a motor includes detecting a pulsed signal having pulse intervals that vary in accordance with the speed of a motor, comparing, when a pulse is detected during that detecting step, a pulse interval of the pulsed signal to a target value corresponding to a target motor speed, generating a drive command in accordance with the pulse interval comparing step to drive the motor at the target speed, comparing, when no pulse is detected during the detecting step, the time elapsed since a most recent pulse to a maximum value corresponding to an abnormally low motor speed, and generating at least accelerate command in accordance with the elapsed time comparing step to accelerate the motor when the elapsed time is greater than or equal to the maximum value.

Embodiments of the invention preferably are used in cameras or similar devices, although other applications also are possible.

BRIEF DESCRIPTION OF THE DRAWINGS

The invention will be described with reference to the following drawings in which like reference numerals designate like elements and wherein.

DETAILED DESCRIPTION OF PREFERRED EMBODIMENTS

Figure 1:
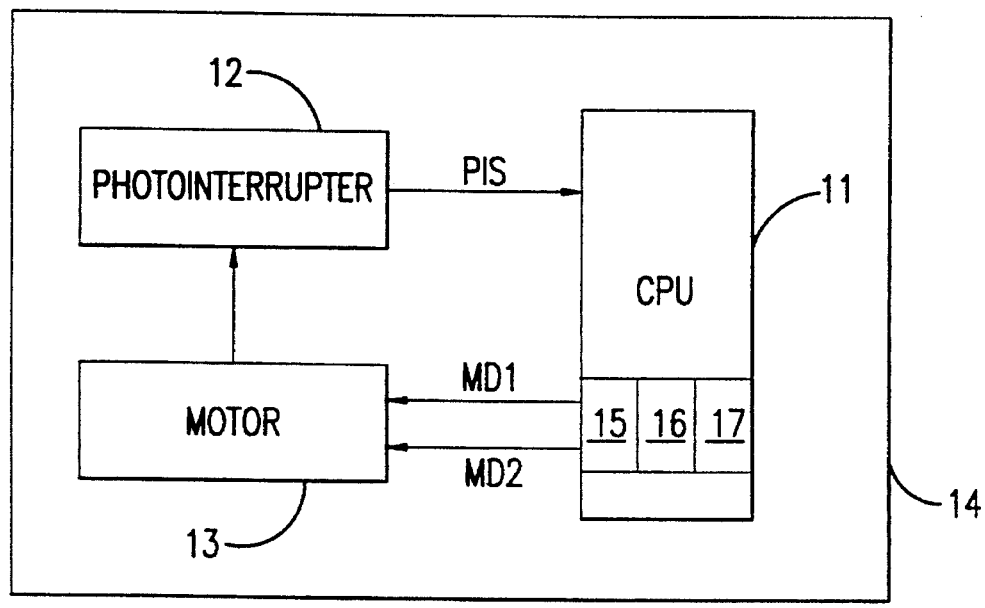
FIG. 1 is a block diagram of a motor speed control device according to an embodiment of the invention.

FIG. 1 is a block diagram showing a motor speed control device according to a preferred embodiment of the invention. CPU 11 is a controller that includes command generator 15, timing mechanism 16 and comparator 17. CPU 11 controls motor 13. Photointerrupter 12 is a motor speed detector for detecting rotational speed of motor 13. Photointerrupter 12 is linked to and driven synchronously with motor 13 and outputs a signal PIS, indicating rotational speed of motor 13, to CPU 11. The signal PIS also is used for interruption processing. CPU 11 receives the signal PIS and outputs signals MD1 and MD2 to motor 13. Signals MD1 and MD2 are used to control forward rotation, reverse rotation, short braking and stopping of motor 13.

A preferred embodiment of the invention is used in connection with camera 14. As indicated previously, however, the invention is not limited to use with cameras.

Figure 2A:
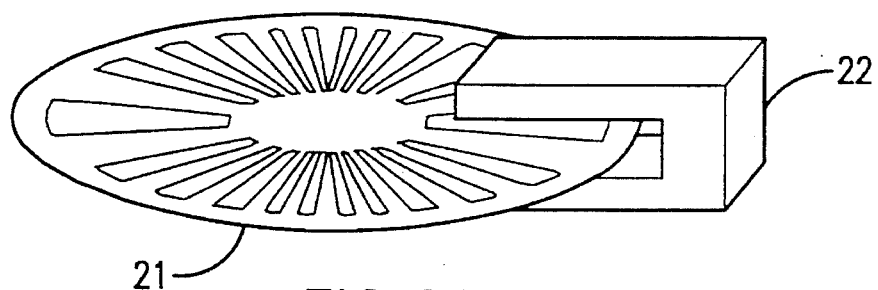
FIG. 2A is a perspective view of the photointerrupter of the FIG. 1 motor speed control device.
Figure 2B:
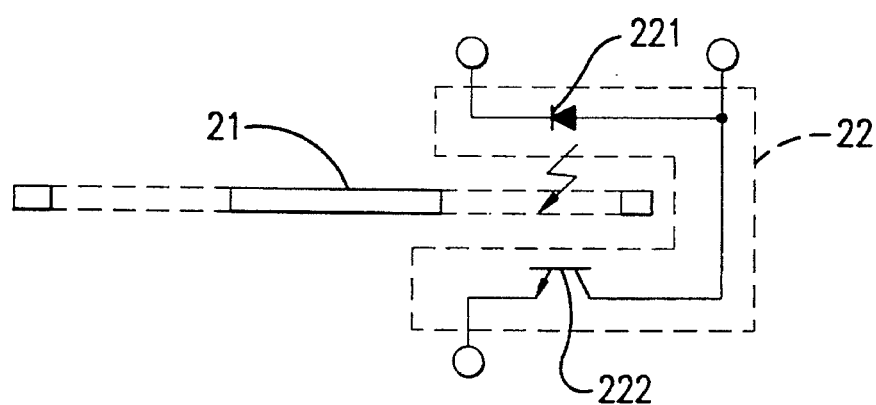
FIG. 2B is a circuit diagram of the FIG. 2A photointerrupter.

FIG. 2A is a perspective view of photointerrupter 12 and FIG. 2B is a circuit diagram of photointerrupter 12. Photointerrupter 12 includes interrupter blades 21 and photocoupler 22, which includes light-producing LED 221 and light receptor 222. When motor 13 rotates under the control of CPU 11, interrupter blades 21 of photointerrupter 12 rotate synchronously with motor 13, alternately blocking and allowing light to pass from LED 221 in photocoupler 22 of photointerrupter 12. Light that is alternately blocked and allowed to pass is converted into an electrical signal by light receptor 222, and is sent as signal PIS to CPU 11.

Figure 3:
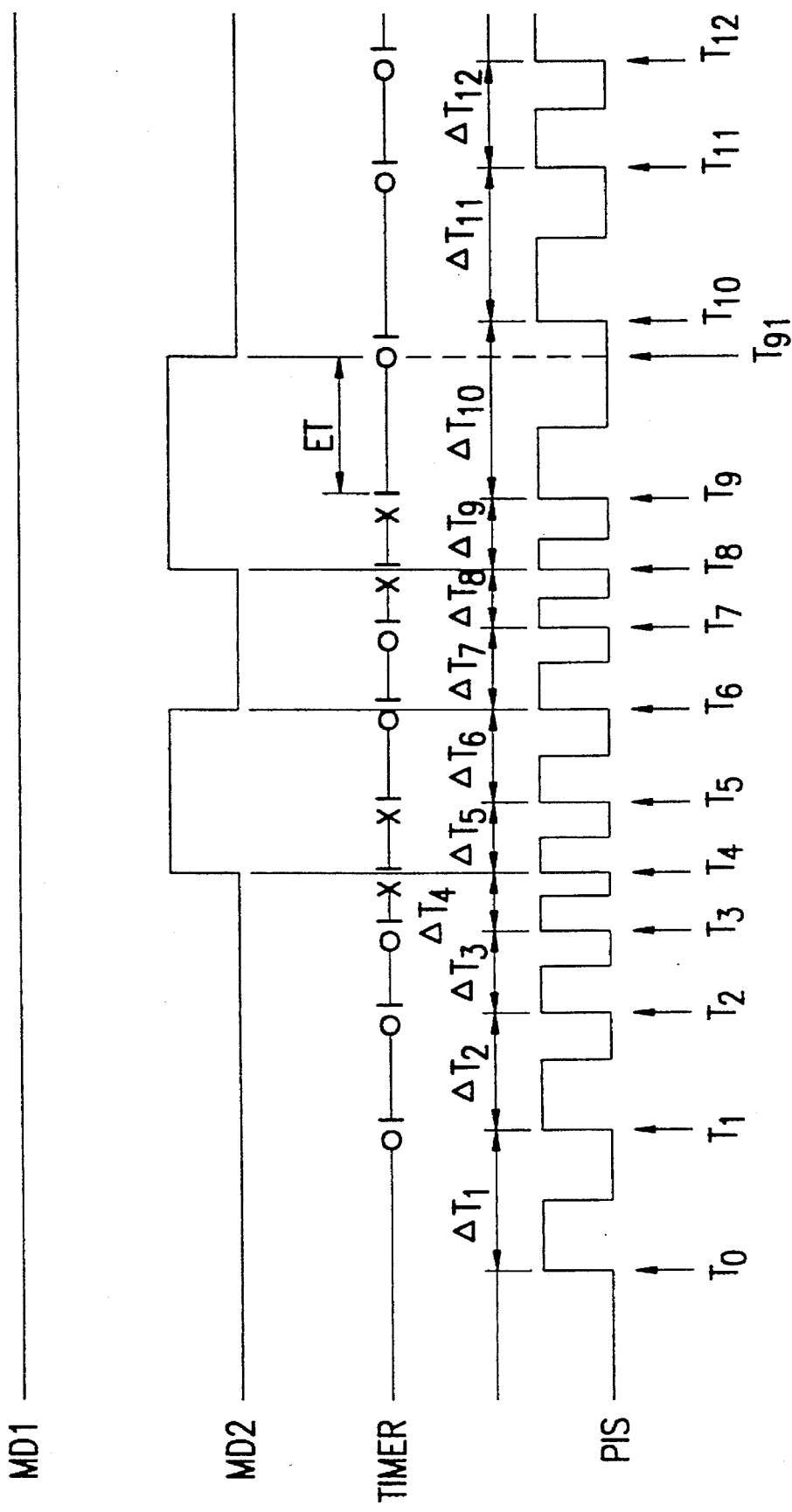
FIG. 3 is a waveform diagram of the FIG. 1 motor speed control device.

FIG. 3 is a time chart showing an example of a constant speed control operation. Motor 13 is controlled as shown below upon receiving speed-control signals MD1 and MD2 from command generator 15.

| MD1 | MD2 | |
| --- | --- | --- |
| Hi | Hi | Stop |
| Hi | Lo | Forward rotation |
| Lo | Hi | Reverse rotation |
| Lo | Lo | Short brake |

Of course, in alternative embodiments, command generator 15 can generate one signal or three or more signals to control motor 13.

CPU 11, which reads Lo and Hi levels of the signal PIS, first sets MD1 to Hi and MD2 to Lo to cause motor 13 to rotate, and also starts a timing mechanism, such as a timer or timers. Signal PIS pulses synchronously with rotation of motor 13. At time T1, when the signal PIS changes from Lo to Hi, CPU 11 starts interruption processing and evaluates elapsed time on the timer. The time interval between pulses in the signal PIS corresponding to a desired speed of motor 13 is called time CT. CPU 11 compares time CT with ΔT values of signal PIS, where ΔT is the elapsed time between pulses of signal PIS, that is, the time between changes of signal PIS from Lo to Hi.

Suppose that at time T1, ΔT1>CT, as in FIG. 3. Elapsed inter-pulse time of signal PIS is longer than the target time CT, that is, motor 13 is rotating too slowly. The pulse interval of signal PIS should be shorter, that is, motor 13 should rotate faster. Therefore, signal MD2 is maintained Lo, to continue acceleration of motor 13.

The same condition exists at times T2 and T3 of the FIG. 3 example; ΔT2>CT and ΔT3>CT. Signal MD2 is maintained low, to continue accelerating motor 13. Normally the rotation of motor 13 is slow at first, and becomes faster as power continues to be supplied. In FIG. 3, the interval through the third pulse of signal PIS indicates low motor speed at the start of motor rotation.

By time T4, rotation of motor 13 has, for the first time, reached and exceeded the target motor speed. Thus, ΔT4≦CT, meaning that the pulse interval of signal PIS is faster than target time CT. The inter-pulse time of signal PIS thus should be slower, so CPU 11 changes signal MD2 to Hi to drive motor 13 in reverse, that is, to decelerate motor 13. At time T5, the same condition as at time T4 exists, with ΔT5≦CT, so motor 13 continues to decelerate. During deceleration, even if motor 13 is decelerated by its own inertia of the rotation, the deceleration reaction to the change in signal MD2 from Lo to Hi is not instantaneous.

As deceleration control of motor 13 continues, at time T6 motor speed has dropped below the target speed, so that ΔT6>CT. CPU 11 then sets signal MD2 to Lo, to accelerate motor 13. At time T7, the same condition as at time T6 exists, with ΔT7>CT. Thus, motor 13 continues to accelerate.

When the load on motor 13 is constant, it is possible to continue constant speed control in this manner. A case where the load on motor 13 changes, however, now will be described.

Because at time T8 the acceleration control at times T6 and T7 becomes effective and ΔT8<CT, motor 13 is decelerated by setting signal MD2 set to Hi at time T8. The same condition exists at time T9 also, that is, ΔT9≦ CT, so deceleration continues. If the load on motor 13 increases and consequently motor 13 stops rotating due to its inertia, no ΔT can be read because no pulses of signal PIS are being input. It thus becomes impossible to continue constant speed control as described previously.

To continue constant speed control even when motor 13 stops, CPU 11 uses elapsed time measured by the previously described timer. The elapse of time ET since time T9 indicates that motor speed is abnormally slow and/or that motor 13 has stopped. CPU 11 then switches signal MD2 from Hi to Lo at time T91, causing motor 13 to accelerate and/or begin rotating again. Accordingly, at time T10, a pulse of signal PIS is input, enabling constant speed control to continue.

In this instance, control is performed based on inter-pulse time measured from one rise of signal PIS to the following rise. It also is possible, however, to base control on inter-pulse time measured from one fall of signal PIS to the next fall, or from a rise to a fall, or from a fall to a rise. In addition, it also is possible to speed up reaction time of motor 13 to CPU 11 by switching signal MD1 to Lo, thereby applying a short brake, instead of switching signal MD2 to Hi.

Figure 4:
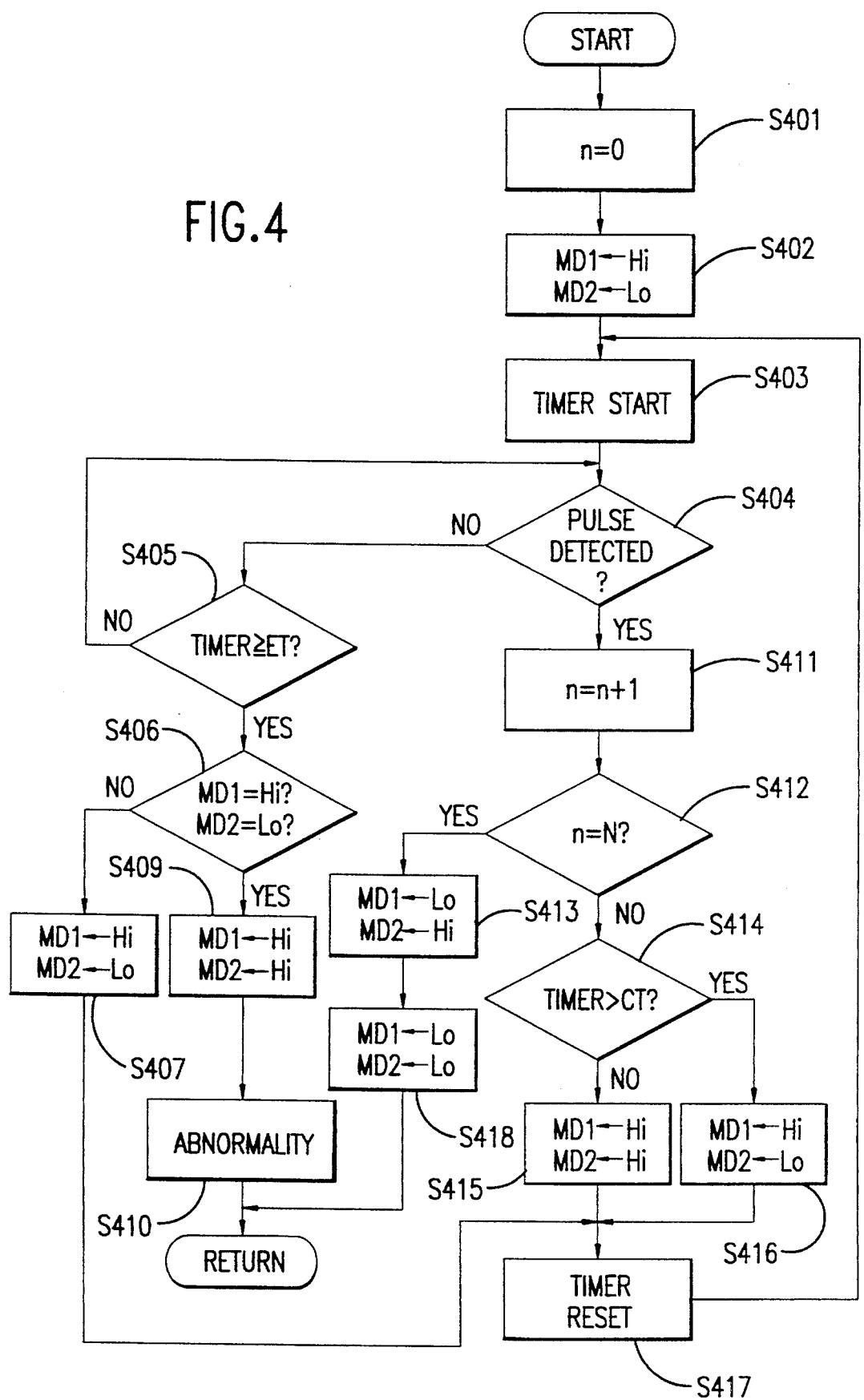
FIG. 4 is a flow chart showing operation of the FIG. 1 motor speed control device.

FIG. 4 is a flow chart showing constant speed control according to an embodiment of the invention. The flow chart illustrates an embodiment wherein the number of pulses is counted and constant speed control is stopped when a predetermined number of pulses is reached.

In step S401, pulse count n is set to 0. In step S402, signal MD1 is set to Hi and signal MD2 is set to Lo to cause motor 13 to rotate forward. In step S403, the timer used for constant speed control is started. In step S404, CPU 11 waits for a pulse of signal PIS to be input. If no pulse is detected in step S404, CPU 11 branches off to step S405.

In step S405, the time on the timer and the time ET are compared. When the time on the timer is not greater than the time ET, that is, when the time on the timer has not reached the time ET, CPU 11 returns to step S404. When the time on the timer is greater than or equal to the time ET, that is, when the time on the timer has reached the time ET in step S405, CPU 11 branches off to step S406. In step S406, it is determined whether motor 13 is being directed to rotate forward. When motor 13 is not being directed to rotate forward, CPU 11 branches off to step S407, where power is supplied to rotate motor 13 forward. The timer is reset in step S417, and CPU 11 returns to step S403.

When power is being supplied to rotate motor 13 forward in step S406, CPU 11 branches off to step S409 to stop motor 13. CPU 11 recognizes an abnormality in step S410, and then concludes constant speed control. CPU 11 recognizes an abnormality in step S410 because although motor 13 is being directed to rotate forward, no pulse of signal PIS is input and the timer exceeds time ET.

When a pulse is detected in step S404, CPU 11 branches off to step S411, increments the counter by one, and advances to step S412. In step S412, when n=N, that is, when the counter has reached a predetermined pulse number N, CPU 11 branches off to step S413, applies reverse rotation in step S413, and applies a short brake in step S418 to stop motor 13. Constant speed control then ends.

When the counter has not reached the predetermined pulse number N in step S412, CPU 11 branches off to step S414. In step S414, the time on the timer and the time CT are compared. When the time on the timer is not greater than the time CT, that is, when the pulse interval is shorter than the time CT, motor 13 is rotating faster than the target speed. CPU 11 thus branches off to step S415, where motor 13 is turned off, as illustrated in FIG. 4, or, alternatively as described above, is decelerated. CPU 11 resets the timer in step S417, and then returns to step S403. When in step S414 the time on the timer is greater than the time CT, that is, when the pulse interval is longer than the time CT and motor 13 is rotating slower than the target speed, CPU 11 branches off to step S416 to decelerate motor 13. CPU 11 then resets the timer in step S417 and returns to step S403.

With the embodiments Of the invention described above, when the pulse interval is greater than a target period corresponding to a target speed, the motor is accelerated. When the pulse interval is less than an initial period, the motor is prevented from accelerating or is decelerated. Thus, motor rotation can be controlled to be maintained essentially constant. After the motor is prevented from accelerating or is decelerated, the motor is accelerated when the pulse interval is greater than a second period, indicating abnormally low motor speed and/or stoppage. The motor thus is controlled to maintain constant speed, even in cases where the motor stops during motor stoppage control because the motor has insufficient inertia.

While the invention has been described with reference to specific embodiments, it is evident that many alternatives, modifications and variations will be apparent to those skilled in the art. Accordingly, embodiments of the invention as set forth herein are intended to be illustrative, not limiting. Various changes may be made without departing from the spirit and scope of the invention.

What is claimed is:

1. A motor speed control device, comprising:
    a motor speed detector coupled with a motor to detect motor speed and generate a pulsed signal having pulse intervals that vary in accordance with motor speed; and
    a controller coupled with the motor speed detector to receive the pulsed signal from the motor speed detector, the controller comprising:
       a timing mechanism for measuring pulse intervals of the pulsed signal;
       a comparator coupled with the timing mechanism to compare pulse intervals of the pulsed signal to a target value corresponding to a target motor speed, and to compare time elapsed since a most recent pulse to a maximum value corresponding to an abnormally low motor speed; and
       a command generator coupled with the comparator to generate a drive command in accordance with the pulse-intervals-to-target-value comparison to drive the motor at the target speed, the command generator further generating an accelerate command in accordance with the elapsed-time-to-maximum-value comparison to accelerate the motor when the elapsed time is greater than or equal to the maximum value.

2. The device of claim 1, wherein the controller further comprises a pulse detector coupled with the motor speed detector to detect whether pulses of the pulsed signal are being generated, the comparator performing the pulse-intervals-to-target-value comparison when the pulse detector detects a pulse of the pulsed signal, the comparator performing the elapsed-time-to-maximum-value comparison when the pulse detector does not detect a pulse of the pulsed signal.

3. The device of claim 1, wherein the command generator generates at least one decelerate speed-control signal as said drive command to decelerate the motor when pulse intervals are less than or equal to the target value.

4. The device of claim 3, wherein the command generator generates at least one stop speed-control signal as said drive command to stop the motor when pulse intervals are less than or equal to the target value.

5. The device of claim 1, wherein the command generator generates at least one accelerate speed-control signal as said drive command to accelerate the motor when pulse intervals exceed the target value.

6. The device of claim 1, wherein the controller further comprises a pulse counter coupled with the motor speed detector to count pulses of the pulsed signal, the command generator generating at least one decelerate command to decelerate the motor when the number of counted pulses is equal to a predetermined pulse number.

7. The device of claim 1, wherein the command generator generates a decelerate command to decelerate the motor when the controller determines that the elapsed time is greater than or equal to the maximum value and the command generator simultaneously is generating at least one accelerate speed-control signal to accelerate the motor.

8. The device of claim 1, wherein the motor speed detector comprises a photointerrupter.

9. The device of claim 1, further comprising a camera for housing the motor speed control device, wherein the motor speed control device controls the speed of a camera motor.

10. A motor speed control device, comprising:
    motor speed detecting means for detecting speed of a motor, the motor speed detecting means generating a pulsed signal having pulse intervals that vary in accordance with motor speed;
    timing means for timing a duration of said pulse intervals;
    comparing means for comparing said duration of said pulse intervals of the pulsed signal to a target value corresponding to a target motor speed, and for comparing time elapsed since a most recent pulse to a maximum value corresponding to an abnormally low motor speed; and
    command generating means for generating a drive command in accordance with the pulse-intervals-to-target-value comparison to drive the motor at the target speed and for generating an accelerate command in accordance with the elapsed-time-to-maximum-value comparison to accelerate the motor when the elapsed time is greater than or equal to the maximum value.

11. The device of claim 10, further comprising pulse detecting means for detecting pulses of the pulsed signal, the comparing means performing the pulse-intervals-to-target-value comparison when the pulse detecting means detects a pulse of the pulsed signal, the comparing means performing the elapsed-time-to-maximum-value comparison when the pulse detecting means does not detect a pulse of the pulsed signal.

12. The device of claim 10, wherein the command generating means generates at least one decelerate speed-control signal as said drive command to decelerate the motor when pulse intervals are less than or equal to the target value.

13. The device of claim 10, wherein the command generating means generates at least one accelerate speed-control signal as said drive command to accelerate the motor when pulse intervals exceed the target value.

14. The device of claim 10, further comprising a camera for housing the motor speed control device, wherein the motor speed control device controls the speed of a camera motor.

15. A method of operating a motor, comprising:
    detecting a pulsed signal having pulse intervals that vary in accordance with the speed of a motor;
    comparing, when a pulse is detected during the detecting step, pulse intervals of the pulsed signal to a target value corresponding to a target motor speed;
    generating a drive command in accordance with the pulse-intervals-to-target-value comparing step to drive the motor at the target speed;
    comparing, when a pulse is not detected during the detecting step, time elapsed since a most recent pulse to a maximum value corresponding to an abnormally low motor speed; and
    generating an accelerate command in accordance with the elapsed-time-to-maximum-value comparing step to accelerate the motor when the elapsed time is greater than or equal to the maximum value.

16. The method of claim 15, wherein the step of generating a drive command to drive the motor at the target speed includes generating at least one decelerate speed-control signal as the drive command to decelerate the motor when pulse intervals are less than or equal to the target value.

17. The method of claim 15, wherein the step of generating a drive command to drive the motor at the target speed includes generating at least one accelerate speed-control signal as the drive command to accelerate the motor when pulse intervals exceed the target value.

18. The method of claim 15, further comprising:
   counting pulses of the pulsed signal; and
   generating a decelerate command to decelerate the motor when the number of counted pulses is equal to a predetermined pulse number.

19. The method of claim 15, further comprising the step of driving the motor in connection with operation of a camera.

20. A motor speed control device, comprising:
   a motor speed detector coupled with a motor to detect motor speed and generate a pulsed signal having pulse intervals that vary in accordance with motor speed; and
   a controller coupled with the motor speed detector to receive the pulsed signal from the motor speed detector, the controller comprising:
      a timing mechanism for measuring pulse intervals of the pulsed signal;
      a comparator coupled with the timing mechanism to compare pulse intervals of the pulsed signal to a target value corresponding to a target motor speed; and
      a command generator coupled with the comparator to generate a drive command in accordance with the pulse-intervals-to-target-value comparison to drive the motor at the target speed, the command generator generating a decelerate command to decelerate the motor when the pulse intervals are less than or equal to the target value.

* * * * *